United States Patent
Wang et al.

(10) Patent No.: US 12,149,920 B2
(45) Date of Patent: Nov. 19, 2024

(54) CALLING METHOD, STORAGE MEDIUM, AND TERMINAL

(71) Applicant: HuiZhou TCL Mobile Communication Co., Ltd., Guangdong (CN)

(72) Inventors: Wanying Wang, Guangdong (CN); Chenli Gao, Guangdong (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 213 days.

(21) Appl. No.: 17/618,565

(22) PCT Filed: Dec. 19, 2019

(86) PCT No.: PCT/CN2019/126568
§ 371 (c)(1),
(2) Date: Dec. 13, 2021

(87) PCT Pub. No.: WO2021/103214
PCT Pub. Date: Jun. 3, 2021

(65) Prior Publication Data
US 2022/0248292 A1 Aug. 4, 2022

(30) Foreign Application Priority Data
Nov. 27, 2019 (CN) .......................... 201911181063.0

(51) Int. Cl.
*H04W 4/90* (2018.01)
*H04L 65/1016* (2022.01)
*H04W 36/00* (2009.01)

(52) U.S. Cl.
CPC ........... *H04W 4/90* (2018.02); *H04L 65/1016* (2013.01); *H04W 36/00224* (2023.05)

(58) Field of Classification Search
CPC . H04W 36/14; H04W 4/90; H04W 36/00224; H04W 36/0022; H04L 65/1016; H04L 65/1073; H04L 65/1069
(Continued)

(56) References Cited

U.S. PATENT DOCUMENTS

| 9,769,640 | B2 | 9/2017 | Chong et al. |
| 2010/0014508 | A1 | 1/2010 | Yang |

(Continued)

FOREIGN PATENT DOCUMENTS

| CN | 101031135 | 9/2007 |
| CN | 101227648 | 7/2008 |

(Continued)

OTHER PUBLICATIONS

Notification of Office Action and Search Report Dated Jul. 23, 2020 From the State Intellectual Property Office of the People's Republic of China Re. Application No. 201911181063.0 and Its Translation of Office Action Into English. (15 Pages).

(Continued)

*Primary Examiner* — Michael Y Mapa

(57) ABSTRACT

A calling method includes steps of sending a verification request to a verification server based on an IP multimedia subsystem (IMS) network when a terminal receives a call instruction, triggered by a communication identification from a user input, under a voice over long-term evolution (VoLTE) network or a voice over WIFI (VoWIFI) network, and the communication identification is not a communication identification supported by a current terminal; receiving a response message returned by the verification server based on the verification request; determining a type of the communication identification according to the response message; and according to the communication identification and the type of the communication identification, switching a (Continued)

network mode of an operator network to which the terminal is currently connected to a target network mode to initiate a call process.

15 Claims, 3 Drawing Sheets

(58) Field of Classification Search
USPC .............................. 455/435.1–445; 370/331
See application file for complete search history.

(56) References Cited

U.S. PATENT DOCUMENTS

| | | | | |
|---|---|---|---|---|
| 2015/0063227 | A1* | 3/2015 | Chaponniere | H04L 65/1016 370/329 |
| 2016/0183156 | A1* | 6/2016 | Chin | H04L 61/5007 370/331 |
| 2017/0064525 | A1* | 3/2017 | Ben Arzi | H04M 3/42059 |
| 2017/0201911 | A1* | 7/2017 | Ng | H04W 36/0022 |

FOREIGN PATENT DOCUMENTS

| | | |
|---|---|---|
| CN | 101277518 | 10/2008 |
| CN | 101394667 | 3/2009 |
| CN | 101877841 | 11/2010 |
| CN | 102369757 | 3/2012 |
| CN | 103702304 | 4/2014 |
| CN | 104956699 | 9/2015 |
| CN | 105992147 | 10/2016 |
| CN | 106791560 | 5/2017 |
| WO | WO 2011/097170 | 8/2011 |
| WO | WO 2015/100661 | 7/2015 |

OTHER PUBLICATIONS

Notification of Office Action and Search Report Dated Apr. 6, 2021 From the State Intellectual Property Office of the People's Republic of China Re. Application No. 201911181063.0 and Its Translation of Office Action Into English. (15 Pages).
International Search Report and the Written Opinion Dated Aug. 27, 2020 From the International Searching Authority Re. Application No. PCT/CN2019/126568 and Its Translation of Search Report Into English. (11 Pages).
Ntt Docombo, "Discussion on UE behaviour after Rejecting Non UE Detectable Emergency Call in IMS", TSG SA WG2 Meeting 99 S2-133307:16P., Sep. 27, 2013.
Ntt Docombo, "Restricting the Use of 'Urn:Service:Sos'" in some Jurisdictions", 3GPP TSG CT WG1 Meeting 115, Feb. 12, 2019.

* cited by examiner

ND TERMINAL

CALLING METHOD, STORAGE MEDIUM, AND TERMINAL

RELATED APPLICATIONS

This application is a National Phase of PCT Patent Application No. PCT/CN2019/126568 having International filing date of Dec. 19, 2019, which claims the benefit of priority of Chinese Patent Application No. 201911181063.0 filed on Nov. 27, 2019. The contents of the above applications are all incorporated by reference as if fully set forth herein in their entirety.

FIELD AND BACKGROUND OF THE INVENTION

The present application relates to a field of communication technology, and more particularly, to a calling method, a storage medium, and a terminal.

After a voice over long-term evolution (VoLTE) network or a voice over WIFI (VoWIFI) network is registered by users, some numbers, such as numbers of emergency calls, cannot be called out due to operator network limitations or communication protocols. The emergency calls refer to dialing alarm or distress numbers such as 112, 110, 119, and 120 from mobile phones. Hotlines for the emergency calls are set up in many countries, a purpose of which is to enable help seekers to access emergency services by police, fire departments, or rescue personnel in critical situations. Distress phone numbers may vary from country to country. Each distress phone number is generally composed of 3 digits for help seekers to memorize and dial. In some countries, there are several distress phone numbers, and different distress phone numbers reach different departments that provide emergency services. Because of the urgency of these numbers, countries have stipulated that any network that is available at a given time can be used for them. However, some types of emergency numbers are not supported by operators, meaning that they cannot reach the corresponding emergency call centers when dialed. In the case that a user encounters an emergency, these types of emergency numbers entered by the user cannot be called out, delaying the user's calls for help.

SUMMARY OF THE INVENTION

Embodiments of the present application provide a calling method, a storage medium, and a terminal, which are capable of saving users time when calling for help and improving efficiency of calls for help.

An embodiment of the present application provides a calling method, comprising steps of:
  sending a verification request to a verification server based on an IP multimedia subsystem (IMS) network, when a terminal receives a call instruction, triggered by a communication identification from a user input, under a voice over long-term evolution (VoLTE) network or a voice over WIFI (VoWIFI) network, and the communication identification is not a communication identification supported by a current terminal;
  receiving a response message returned by the verification server based on the verification request;
  determining a type of the communication identification according to the response message; and
  according to the communication identification and the type of the communication identification, switching a network mode of an operator network to which the terminal is currently connected to a target network mode to initiate a call process.

Accordingly, an embodiment of the present application further provides a calling device, comprising:
  a processing unit configured to send a verification request to a verification server based on an IP multimedia subsystem (IMS) network, when a terminal receives a call instruction, triggered by a communication identification from a user input, under a voice over long-term evolution (VoLTE) network or a voice over WIFI (VoWIFI) network, and the communication identification is not a communication identification supported by a current terminal;
  a receiving unit configured to receive a response message returned by the verification server based on the verification request;
  a determining unit configured to determine, according to the response message, a type of the communication identification;
  a call process establishment unit configured to switch, according to the communication identification and the type of the communication identification, a network mode of an operator network to which the terminal is currently connected to a target network mode to initiate a call process.

In some embodiments, the determining unit comprises an identifying sub-unit and a first determining sub-unit;
  the identifying sub-unit is configured to identify a prefix of a type identifier;
  the first determining sub-unit is configured to determine, according to the prefix, the type of the communication identification.

In some embodiments, the call process establishment unit comprises a first calling sub-unit and a second calling sub-unit;
  the first calling sub-unit is configured to send an emergency call request based on a 2G/3G network when the type of the communication identification is an emergency communication identification specified by the 3rd Generation Partnership Project (3GPP) protocol;
  the second calling sub-unit is configured to send a common call request based on the 2G/3G network when the type of the communication identification is not an emergency communication identifier specified by the 3GPP protocol.

In some embodiments, the device further comprises a second determining sub-unit and a changing sub-unit;
  the second determining sub-unit is configured to determine a current network mode after ending a call;
  the changing sub-unit is configured to change the current network mode to re-register to the VoLTE network or the VoWIFI network when the current network mode is the 2G/3G network.

Accordingly, an embodiment of the present application further comprises a computer-readable storage medium, the storage medium stores instructions, and the instructions are loaded by a processor to execute the following steps:
  sending a verification request to a verification server based on an IP multimedia subsystem (IMS) network, when a terminal receives a call instruction, triggered by a communication identification from a user input, under a voice over long-term evolution (VoLTE) network or a voice over WWI (VoWIFI) network, and the communication identification is not a communication identification supported by a current terminal;
  receiving a response message returned by the verification server based on the verification request;

determining a type of the communication identification according to the response message;

according to the communication identification and the type of the communication identification, switching a network mode of an operator network to which the terminal is currently connected to a target network mode to initiate a call process.

Accordingly, an embodiment of the present application further provides a terminal, comprising: a processor and a memory; a plurality of instructions stored in the memory, the processor loads the instructions stored in the memory to execute the following steps:

sending a verification request to a verification server based on an IP multimedia subsystem (IMS) network, when the terminal receives a call instruction, triggered by a communication identification from a user input, under a voice over long-term evolution (VoLTE) network or a voice over WWI (VoWIFI) network, and the communication identification is not a communication identification supported by a current terminal;

receiving a response message returned by the verification server based on the verification request;

determining a type of the communication identification according to the response message;

according to the communication identification and the type of the communication identification, switching a network mode of an operator network to which the terminal is currently connected to a target network mode to initiate a call process.

Embodiments of the present application provide a calling method, a storage medium, and a terminal, which are capable of saving users time when calling for help and improving efficiency of calls for help.

DESCRIPTION OF SPECIFIC EMBODIMENTS OF THE INVENTION

Technical solutions in embodiments of the present application will be clearly and completely described below in conjunction with drawings in the embodiments of the present application. Obviously, embodiments described are only a portion of the embodiments of the present application, not all of them. Based on the embodiments of the present application, other embodiments obtained by persons skilled in this art under the premise of no creative efforts made are within the protection scope of the present application.

Terms "first", "second", and "third" in the present invention are used to distinguish different objects, rather than describing a specific sequence. Further, terms "including", "having", and their variations are intended to cover non-exclusive inclusions. For example, processes, methods, systems, products, or devices including a series of steps or modules are not limited to include listed steps or modules, but optionally includes unlisted steps or modules, or optionally further includes other steps or modules inherent to these processes, methods, products or devices.

The present embodiments provide a calling method, a storage medium, and a terminal.

An embodiment of the present application provides a calling system, including: a calling device provided by an embodiment of the present application. The calling device may be integrated into a terminal, and the terminal may be a mobile phone, a tablet computer, a notebook computer, or other equipment. In addition, the calling system may further include other devices, such as servers.

Figure 1:
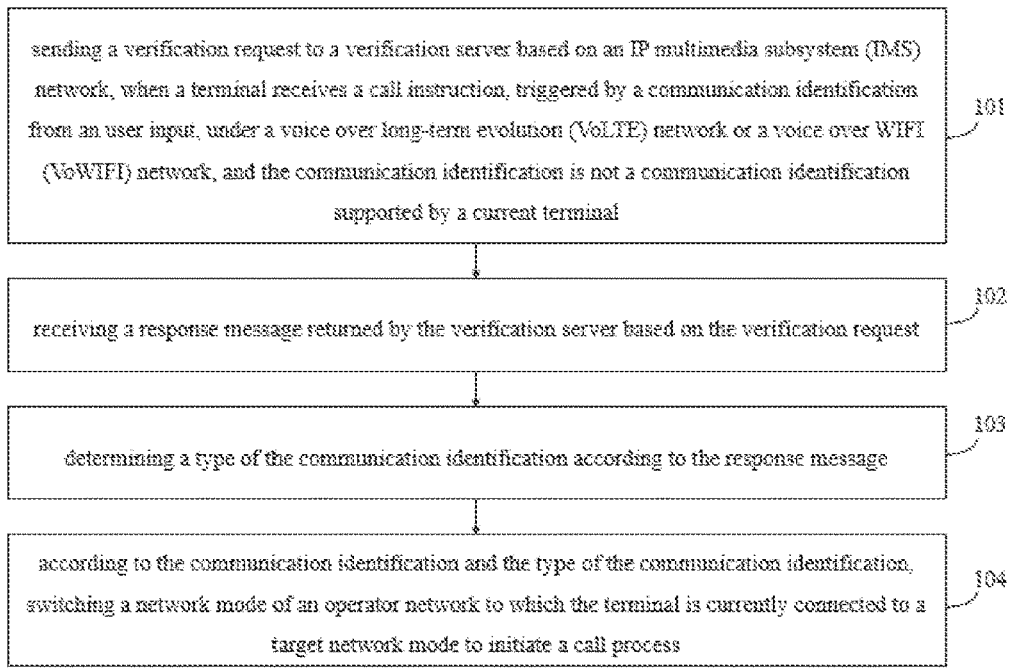
FIG. 1 is a schematic flowchart of a calling method according to an embodiment of the present application.

For example, taking the calling system integrated into the terminal as an example, referring to FIG. 1, when the terminal receives a call instruction, triggered by a communication identification from a user input, under a voice over long-term evolution (VoLTE) network or a voice over WIFI (VoWIFI) network, if the communication identification is not a communication identification supported by a current terminal, a verification request is sent based on an IP multimedia subsystem (IMS) network, and a response message returned by the verification server is received based on the verification request, then a type of the communication identification is determined according to the response message, and then a network mode of an operator network to which the terminal is currently connected is switched to a target network mode to initiate a call process according to the communication identification and the type of the communication identification.

The calling method provided by the embodiment of the present application can be implemented in a calling device. Specifically, the calling device can be integrated into electronic equipment, which includes, but is not limited to, computers, smart watches, mobile phones, tablet computers, and other equipment.

Detailed descriptions are given below. It should be noted that an order of the following embodiments is not intended to limit a preferred order of the embodiments.

This embodiment will be described from a point of view of a calling device. Specifically, the calling device may be integrated into a terminal, wherein the terminal may include a mobile phone, a smart watch, a tablet computer, a notebook computer, a personal computer (PC), etc.

The calling method includes: when the terminal receives a call instruction triggered by a communication identification from a user input, under a voice over long term evolution (VoLTE) network or a voice over WIFI (VoWIFI) network, if the communication identification is not a communication identification supported by a current terminal, a verification request is sent based on an IP multimedia subsystem (IMS) network, and a response message returned by the verification server is received based on the verification request, then a type of the communication identification is determined according to the response message, and then a network mode of an operator network to which the terminal is currently connected is switched to a target network mode to initiate a call process according to the communication identification and the type of the communication identification.

As shown in FIG. 1, the calling method is provided, the calling method can be executed by a processor of a terminal, and a specific process can be as follows:

Step 101: sending a verification request to a verification server based on an IP multimedia subsystem (IMS) network, when a terminal receives a call instruction, triggered by a communication identification from a user input, under a voice over long-term evolution (VoLTE) network or a voice over WIFI (VoWIFI) network, and the communication identification is not a communication identification supported by a current terminal.

Wherein, the IMS is a new form of multimedia business, which is capable of meeting requirements of end customers in respect of more innovative and diversified multimedia business. The IMS is considered to be a core technology of next-generation networks, and it is also an important way to solve differentiated services such as an integration of mobile and fixed networks and introducing triple integration of voice, data, and video.

Wherein, the VoLTE is a high-speed wireless communication mode for mobile phones and data terminals. It is based on the IMS network and is carried on a 4G network, so that voice services (control and media aspect) are transmitted as a data stream in an LTE data carrier network instead of maintaining and relying on a traditional circuit-switched voice network, thereby realizing unification of data and voice services on a same network. Wherein, the VoWIFI and the VoLTE are both IMS-based voice call technologies. A main difference between the VoWIFI and the VoLTE is that the former uses WIFI as an access point, and the latter accesses a base station. However, both must eventually be connected to the IMS, and the IP voice services are controlled and managed by operators.

Wherein, the communication identification refers to a phone number.

Wherein, the communication identification supported by the current terminal includes a pre-customized phone number and a phone number supported by a SIM card that are supported by a current operator network.

Wherein, the verification server is a device that provides computing services for the IMS network.

Wherein, the verification request is a session establishment signaling sent by a terminal when a user makes a call.

For example, if the terminal is a mobile phone, and the user dials some phone numbers through the IMS network, if the phone numbers are not pre-customized phone numbers or phone numbers supported by SIM cards that are supported by the current operator network, the IMS will determine whether the short numbers are emergency numbers and return the determination result to the current terminal, and then user equipment (UE) will initiate MO INVITE signaling, i.e., the session establishment signaling, to the verification server.

Step 102: receiving a response message returned by the verification server based on the verification request.

For example, taking the example in Step 101 as an example, when the verification server receives the session establishment signaling, it will return a response message 380 Alternative Service signaling.

Step 103: determining a type of the communication identification according to the response message.

Wherein, the type of communication identification can be a type of emergency numbers or a type of common numbers. Emergency numbers refer to alarm or distress numbers such as 112, 110, 119, and 120 dialed from a mobile phone. Common numbers refer to numbers other than emergency numbers used by users to communicate with each other.

In some embodiments, the step of "determining the type of the communication identification according to the response message" may include the following steps:

Wherein, the response information carries a type identifier.

(11) Determining the type of the communication identification according to the type identifier;
(12) identifying a prefix of the type identifier; and
(13) determining the type of the communication identification according to the prefix.

Refer to the following table for types of uniform resource identifier (URI) converted from phone numbers in Contact:

| Code | 380AS Emergency URI | Short Code Description | Setup |
|---|---|---|---|
| 999 | urn:service:sos.ambulance | Emergency medical services | Emergency setup (Ambulance Guard:true) |
| 998 | urn:service:sos.fire | Fire Rescue | Emergency setup (Fire Brigade:true) |
| 997 | urn:service:sos.police | Police | Emergency setup (Police:true) |
| 985 | urn:service:sos.mountain | See and Mountain rescue | Emergency setup (Mountain rescue:true) |
| 984 | urn:service:sos.marine | River rescue | Emergency setup (Marine Guard:true) |
| 996 | urn:service:sos.country-specific.p1.996 | Anti-terrorist center | Setup (996) |
| 995 | urn:service:sos.country-specific.p1.995 | Police - Child Alert system | Setup (995) |
| 994 | urn:service:sos.country-specific.p1.994 | Emergency water supply, | Setup (994) |
| 993 | urn:service:sos.country-specific.p1.993 | Emergency heating | Setup (993) |
| 992 | urn:service:sos.country-specific.p1.992 | Emergency gas works, | Setup (992) |
| 991 | urn:service:sos.country-specific.p1.991 | Emergency power | Setup (991) |
| 987 | urn:service:sos.country-specific.p1.987 | Crisis Management Center | Setup (987) |
| 986 | urn:service:sos.country-specific.p1.986 | Municipal Police | Setup (986) |

For example, taking the example in Step 102 as an example, the response message is 380 Alternative Service signaling and carries a parameter Contact URI, and the type of the communication identification can be determined according to a prefix of the parameter Contact URI. For example, when the parameter Contact URI carries a urn:service:sos prefix, the IMS network will match these short numbers to emergency numbers.

Step 104: according to the communication identification and the type of the communication identification, switching a network mode of an operator network to which the terminal is currently connected to a target network mode to initiate a call process.

Wherein, the network mode refers to a network type. For example, China's mobile phone network modes include CDMA 1× occupied by CDMA mobile phones, 800 MHZ frequency band; 900/1800/1900 MHZ frequency band occupied by Global System for Mobile Communications (GSM) mobile phones; 900/1800 MHZ frequency band occupied by GSM 1× dual-mode (that is, WCDMA) of the last two years; 900/1800/1900/2100 MHz frequency band occupied by 3G; 1920 to 2170 MHZ frequency band occupied by 4G. 2555 to 2575 MHz and 2300 to 2320 MHz frequency bands occupied by Unicom 4GTD LTE.

In some embodiments, the step of "switching the network mode of the operator network to which the terminal is currently connected to the target network mode to initiate the call process" may include the following steps:

(21) initiating a circuit switched fallback (CSFB) and registering to a 2G/3G network according to the communication identification and the type of the communication identification;

(22) initiating the call process based on the 2G/3G network;

When the type of the communication identification is an emergency communication identification specified by the 3rd Generation Partnership Project (3GPP) protocol, an emergency call request is sent based on the 2G/3G network;

(23) when the type of the communication identification is not an emergency communication identifier specified by the 3GPP protocol, a common call request is sent based on the 2G/3G network.

In some embodiments, after the step of "switching, according to the communication identification and the type of the communication identification, the network mode of the operator network to which the terminal is currently connected to the target network mode to initiate the call process," the method may include the following steps:

(24) determining a current network mode after ending a call;

(25) changing the current network mode to re-register to the VoLTE network or the VoWIFI network when the current network mode is a 2G/3G network.

Wherein, the 3GPP is used to define a complete end-to-end system specification to ensure compliance with industry needs to achieve seamless interoperability between different operators, to provide mobile devices with a necessary global scale and also to achieve smooth transition of GSM from a 2G network to a 3G network.

Wherein, a signaling of an emergency call request is emergency setup, and a signaling of a common call request is setup. For example, taking the example in Step 103 as an example, an IMS module of a UE modem starts to parse contents of the parameter Contact URI after receiving the response message and initiates the CSFB to re-initiate registration to the 2G/3G network. If the phone number is an emergency number specified by the 3GPP, the current terminal initiates emergency dialing through the 2G/3G network. If the phone number is not an emergency number specified by the 3GPP protocol, the current terminal initiates a common dialing through the 2G/3G network.

Because emergency numbers that are not specified in the protocol cannot access emergency call centers, once this type of numbers are dialed, a mobile phone interface will prompt an emergency message. When the emergency numbers that are not specified in the protocol are dialed, systems will automatically return a voice announcement, which lasts about two minutes. In this solution, this process is changed to a common dialing process, and since the numbers do not have corresponding terminals, an empty number will be prompted on a mobile phone interface, thereby preventing users from making multiple calls due to emergency numbers prompt on the mobile phone interface, which will delay asking for help. Wherein, when a phone number judged as an emergency number by the IMS network is dialed, the mobile phone interface will display an emergency message.

In the embodiments of the present application, when the terminal receives the call instruction triggered by the communication identification from the user input, under the VoLTE network or the VoWIFI network, if the communication identification is not a communication identification supported by the current terminal, the verification request is sent based on the IMS network, and the response message returned by the verification server is received based on the verification request, then the type of the communication identification is determined according to the response message, and then the network mode of the operator network to which the terminal is currently connected is switched to the target network mode to initiate the call process according to the communication identification and the type of the communication identification. This solution is capable of saving users time when calling for help and improving efficiency of calls for help.

Based on the contents described above, the method provided by the embodiments of the present application will be illustrated below with examples.

Figure 2:
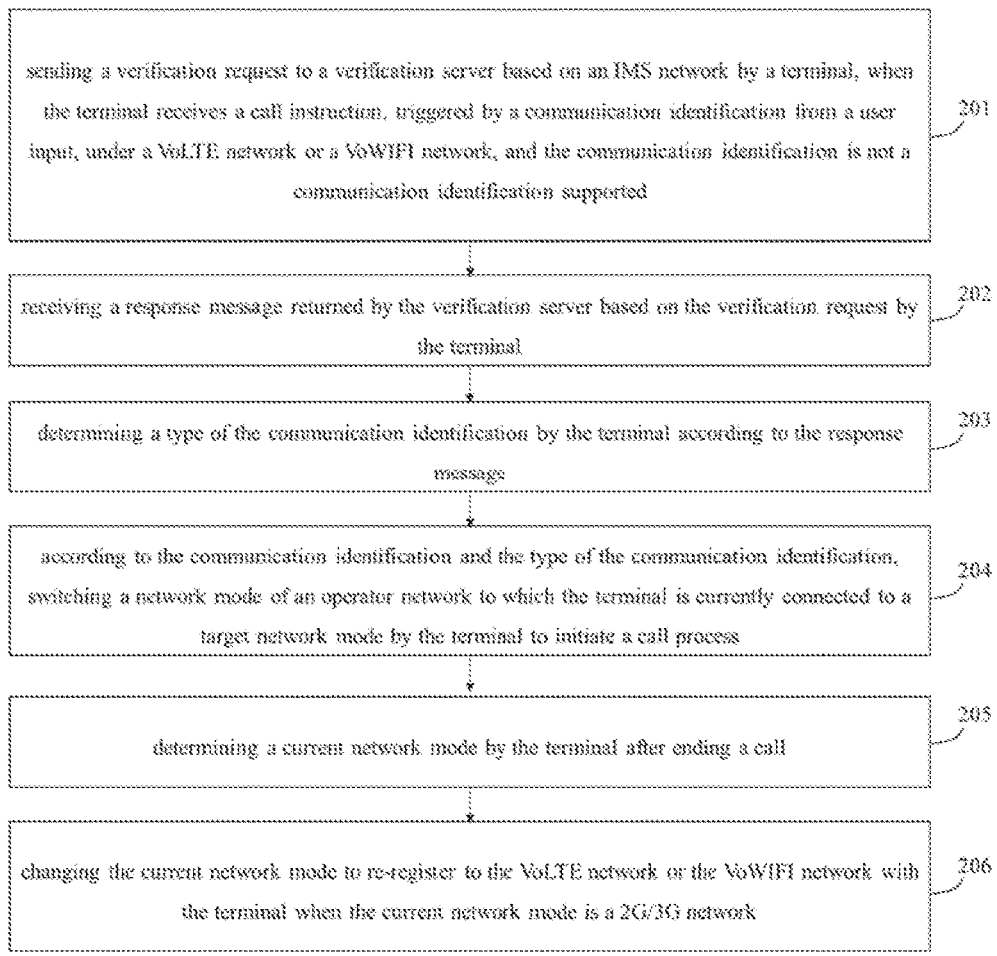
FIG. 2 is a schematic flowchart of another calling method according to an embodiment of the present application.

Referring to FIG. 2, a specific process of a calling method may include steps of:

Step 201: sending a verification request to a verification server based on an IMS network by a terminal, when the terminal receives a call instruction, triggered by a communication identification from a user input, under a VoLTE network or a VoWIFI network, and the communication identification is not a communication identification supported.

Wherein, the communication identification supported by the current terminal includes a pre-customized phone number and a phone number supported by a SIM card that are supported by a current operator network.

Wherein, a verification request is a session establishment signaling sent by a terminal when a user makes a call.

For example, if the terminal is a mobile phone, and the user dials some phone numbers through the IMS network, if the phone numbers are not pre-customized phone numbers or phone numbers supported by SIM cards that are supported by the current operator network, the IMS will determine whether the short numbers are emergency numbers and return the determination result to the current terminal, and then UE will initiate MO INVITE signaling, i.e., the session establishment signaling, to the verification server.

Step 202: receiving a response message returned by the verification server based on the verification request by the terminal.

For example, when the verification server receives the session establishment signaling, it will return a response message 380 Alternative Service signaling, and the terminal receives the response message.

Step 203: determining a type of the communication identification by the terminal according to the response message.

For example, specific details can be as follows: the type of the communication identification is determined according to a type identifier, a prefix of the type identifier is identified, and then the type of the communication identification is determined according to the prefix. The received response message 380 Alternative Service signaling carries a parameter Contact URI, and the type of the communication identification can be determined according to a prefix of the parameter Contact URI. For example, when the parameter Contact URI carries a urn:service:sos prefix, the IMS network will match these short numbers to emergency numbers.

Step 204: according to the communication identification and the type of the communication identification, switching a network mode of an operator network to which the terminal is currently connected to a target network mode by the terminal to initiate a call process.

Wherein, the network mode refers to a network type. For example, 2G, 3G, 4G, and 5G are different network modes.

For example, specific details can be as follows: a circuit switched fallback (CSFB) is initiated and a 2G/3G network is registered according to the communication identification and the type of the communication identification. When the type of the communication identification is an emergency communication identification specified by the 3GPP protocol, an emergency call request is sent based on a 2G/3G network; when the type of the communication identification is not an emergency communication identifier specified by the 3GPP protocol, a common call request is sent based on the 2G/3G network. After ending a call, a current network mode is determined; when the current network mode is a 2G/3G network, the current network mode is changed to re-register to the VoLTE network or the VoWIFI network.

Wherein, the 3GPP is used to define a complete end-to-end system specification to ensure compliance with industry needs to achieve seamless interoperability between different operators, to provide mobile devices with a necessary global scale, and also to achieve smooth transition of GSM from a 2G network to a 3G network.

For example, taking the example in Step 103 as an example, an IMS module of a UE modem starts to parse contents of the parameter Contact URI after receiving the response message, and initiates the CSFB to re-initiate registration to the 2G/3G network. If the phone number is an emergency number specified by the 3GPP, the current terminal initiates emergency dialing through the 2G/3G network. If the phone number is not an emergency number specified by the 3GPP protocol, the current terminal initiates a common dialing through the 2G/3G network.

Step 205: determining a current network mode by the terminal after ending a call.

Step 206: changing the current network mode to re-register to the VoLTE network or the VoWIFI network with the terminal when the current network mode is a 2G/3G network.

In the embodiments of the present application, when the terminal receives a call instruction triggered by the communication identification from the user input in the VoLTE network or the VoWIFI network, if the communication identification is not a communication identification supported by the current terminal, a verification request is sent based on the IMS network, and the response message returned by the verification server is received based on the verification request, then the type of the communication identification is determined according to the response message, and then a network mode of the operator network to which the terminal is currently connected is switched to a target network mode to initiate a call process according to the communication identification and the type of the communication identification. This solution is capable of saving users time when calling for help and improving efficiency of calls for help.

Based on the contents described above, the method provided by the embodiments of the present application will be illustrated below with examples.

Figure 3:
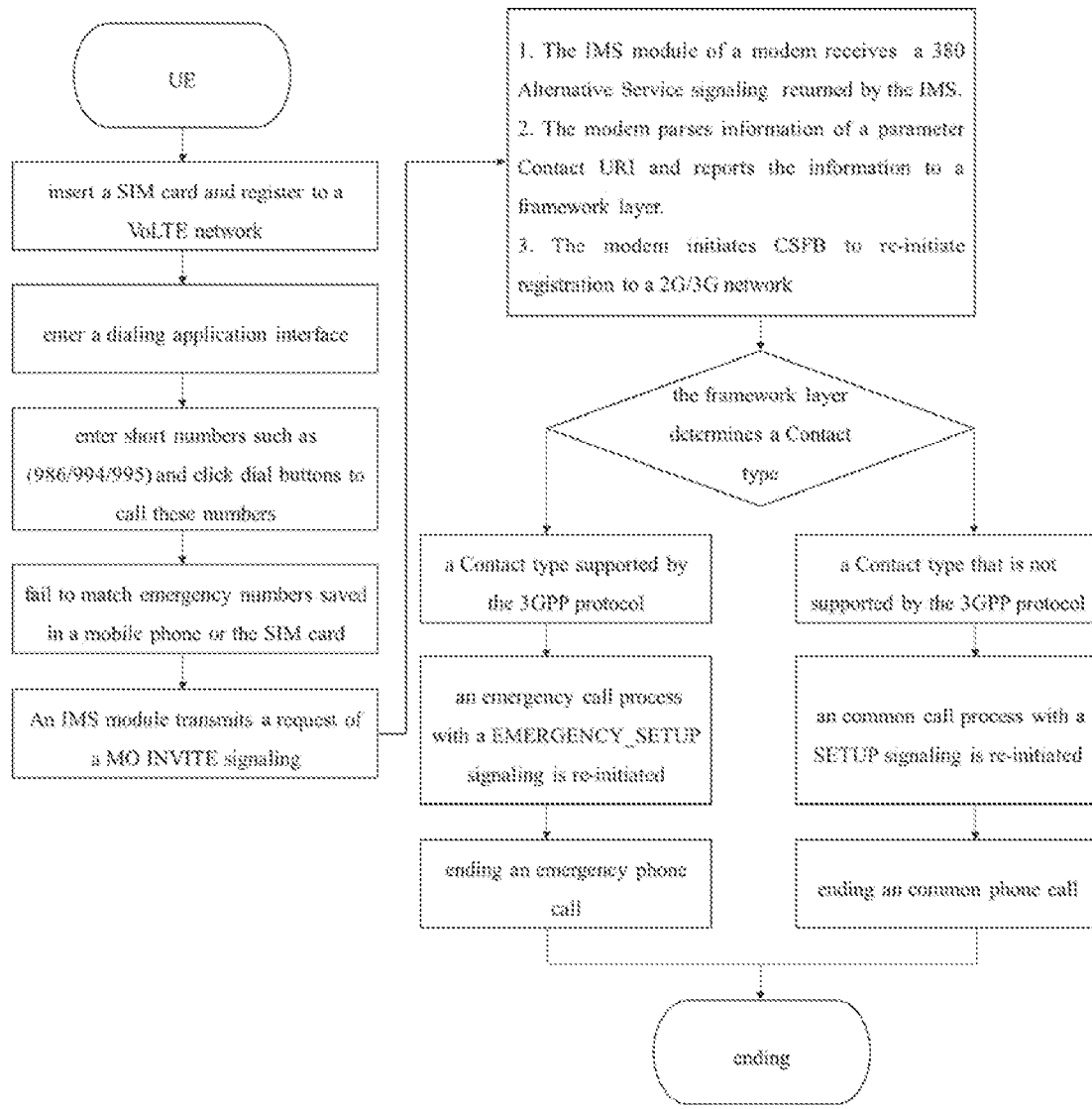
FIG. 3 is a schematic flowchart of an application of a calling method according to an embodiment of the present application.

As shown in FIG. 3, UE starts, a user inserts a SIM card of an operator, the VoLTE network or the VoWIFI network is registered, and then after being prompted to a dialing application interface of a dialing application, short numbers such as (986/994/995) are entered, and dial buttons are clicked to call these numbers. If the current dialing short numbers fail to match emergency numbers saved in a mobile phone or the SIM card, the UE will initiate MO INVITE signaling to the IMS network, and the IMS network returns a 380 Alternative Service signaling of the UE carrying the parameter Contact URI. An IMS module of a UE modem starts to parse contents of the parameter Contact URI after receiving the 380 Alternative Service signaling, and initiates the CSFB to re-initiate registration to the 2G/3G network. The UE modem parses the contents of the parameter Contact URI of the 380 Alternative Service signaling and reports it to a framework layer. The framework layer determines a Contact type according to parameters of the contents of the parsed parameter Contact URI, and executes the following processing:

If the parameter Contact URI carries a Category type which is a Contact type supported by the 3GPP protocol, such as <urn:s ervice:sos.police>, an emergency call process with a EMERGENCY SETUP signaling will be re-initiated and be directed to corresponding emergency call centers.

If the parameter Contact URI carries a Category type which is a Contact type not supported by the 3GPP protocol, such as <urn: service: sos.country-specific.pl.986>, a common call process with a SETUP signaling will be re-initiated, and a common phone number will be dialed out. As a result, an empty number will be prompted on the mobile phone interface, so as to prevent the user from making multiple calls due to the emergency number prompted on the mobile phone interface, which will delay asking for help.

For the sake of better implementing the calling method provided by the embodiments of the present application, in some embodiments, a calling device is further provided. The calling device is suitable for terminals. Specific implementation details of which may refer to the descriptions in the methods provided by the embodiments.

Figure 4:
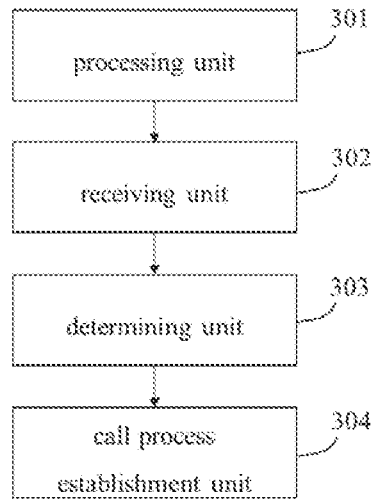
FIG. 4 is a schematic structural diagram showing a calling device according to an embodiment of the present application.

In some embodiments, a calling device is further provided. Specifically, the calling device may be integrated into a terminal. For example, it can be integrated into a client terminal in a client form. As shown in FIG. 4, the calling device may include: a processing unit 301, a receiving unit 302, a determining unit 303, and a call process establishment unit 304. Specific steps are as follows:

the processing unit 301 is configured to send a verification request to a verification server based on an IMS network when a terminal receives a call instruction triggered by a communication identification from a user input in a VoLTE network or a VoWIFI network, and the communication identification is not a communication identification supported by a current terminal.

The receiving unit 302 is configured to receive a response message returned by the verification server based on the verification request.

The determining unit 303 is configured to determine, according to the response message, a type of the communication identification.

The call process establishment unit 304 is configured to switch, according to the communication identification and the type of the communication identification, a network mode of an operator network to which the terminal is currently connected to a target network mode to initiate a call process.

Figure 5:
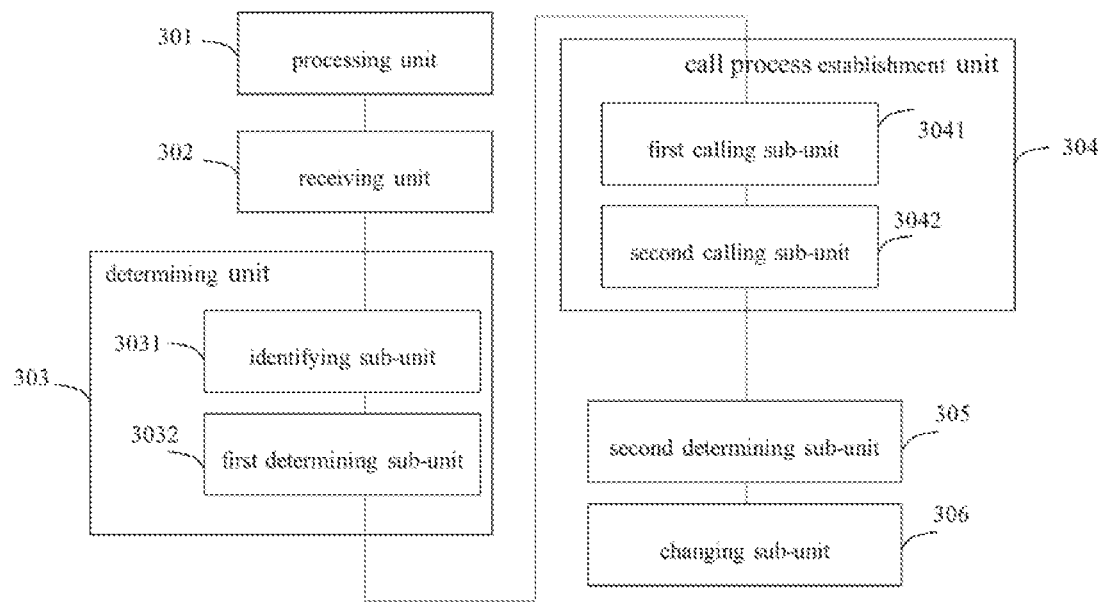
FIG. 5 is another schematic structural diagram showing a calling device according to an embodiment of the present application.

In some embodiments, referring to FIG. 5, the determining unit 303 includes an identifying sub-unit 3031 and a first determining sub-unit 3032;

the identifying sub-unit 3031 is configured to identify a prefix of a type identifier;

The first determining sub-unit 3032 is configured to determine, according to the prefix, the type of the communication identification.

In some embodiments, referring to FIG. 5, the call process establishment unit 304 includes a first calling sub-unit 3041 and a second calling sub-unit 3042;

The first calling sub-unit 3041 is configured to send an emergency call request based on a 2G/3G network when the type of the communication identification is an emergency communication identification specified by the 3GPP protocol;

The second calling sub-unit 3042 is configured to send a common call request based on the 2G/3G network when the type of the communication identification is not an emergency communication identifier specified by the 3GPP protocol.

In some embodiments, referring to FIG. 5, the device further includes a second determining sub-unit 305 and a changing sub-unit 306;

The second determining sub-unit 305 is configured to determine a current network mode after ending a call;

The changing sub-unit 306 is configured to change the current network mode to re-register to the VoLTE network or the VoWIFI network when the current network mode is a 2G/3G network.

It can be known from the above description that in the embodiments of the present application, when the terminal receives the call instruction triggered by the communication identification from the user input in the VoLTE network or the VoWIFI network, if the communication identification is not a communication identification supported by the current terminal, the verification request is sent based on the IMS network, and the response message returned by the verification server is received based on the verification request, then the type of the communication identification is determined according to the response message, and then the network mode of the operator network to which the terminal is currently connected is switched to the a target network mode to initiate the call process according to the communication identification and the type of the communication identification. This solution is capable of saving users time when calling for help and improving efficiency of calls for help.

Figure 6:
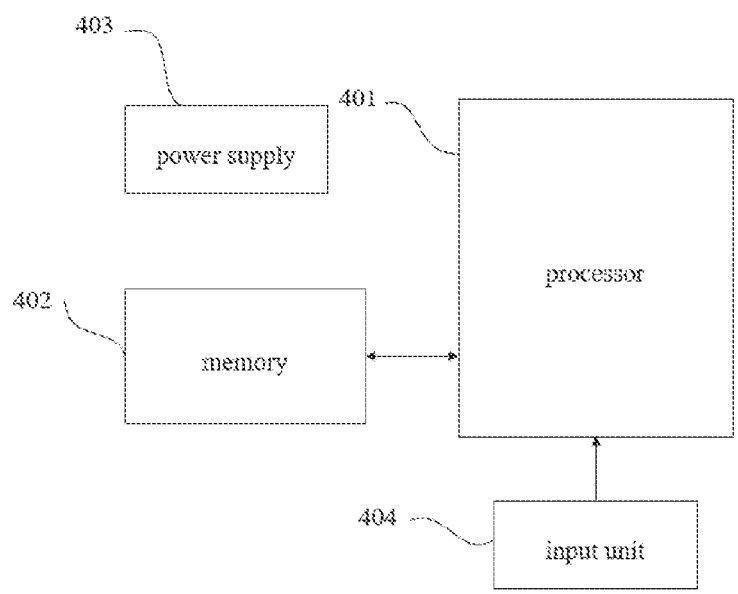
FIG. 6 is a schematic structural diagram showing a terminal according to an embodiment of the present application.

The embodiments of the present application further provide a terminal, which may be a mobile phone, a smart watch, a tablet computer, a notebook computer, a personal computer (PC), etc. As shown in FIG. 6, which is a schematic structural diagram showing a terminal according to an embodiment of the present application, specifically:

The terminal may include a processor 401 having one or more processing cores, a memory 402 having one or more computer-readable storage medium, a power supply 403, an input unit 404, and other components. Persons skilled in this art may understand that a structure of the terminal shown in FIG. 6 does not constitute a limitation on the terminal, it may include more or fewer components than shown in the figure, or combine some components, or arrange different components, wherein:

The processor 401 is a control center of the terminal, using various interfaces and wires to connect various parts of the entire terminal. By running or executing software programs and/or modules stored in the memory 402 and calling data stored in the memory 402, various functions and processing data of the terminal are executed, thereby systematically monitoring the terminal. Optionally, the processor 401 may include one or more processing core. Preferably, the processor 401 can be integrated into an application processor and a modem processor, wherein the application processor is mainly used to deal with operating systems, user interfaces, and application programs, etc. The modem processor is mainly used to deal with wireless communication. It can be understood that the modem processor described above may also not be integrated into the processor 401.

The memory 402 can be configured to store software programs and modules. The processor 401 executes various functions, applications and data processing by running the software programs and the modules stored in the memory 402. The memory 402 may mainly include a program storage area and a data storage area, wherein operating systems and application programs required by at least one function (such as a sound playback function, an image playback function, etc.) may be stored in the program storage area, and data created according to use of the terminal may be stored in the data storage area. In addition, the memory 402 may include a high-speed random-access memory and may further include a non-volatile memory, such as at least one magnetic disk storage device, a flash memory device, or other volatile solid-state storage devices. Accordingly, the memory 402 may further include a memory controller to provide the processor 401 access to the memory 402.

The terminal further includes the power supply 403 used for supplying power to various components. Preferably, the power supply 403 may be logically connected to the processor 401 through a power management system, thereby realizing management of functions such as charging, discharging, and power consumption. The power supply 403 may further include one or more direct current or alternating current power sources, recharging systems, power failure detection circuits, power converters or inverters, power indicator, and other components.

The terminal may further include an input unit 404. The input unit 404 may be used to receive entered numbers or character information and provide a keyboard, a mouse, an operating arm, or optical or trackball input signals related to user settings and function controls.

Although not shown, the terminal may further include display units, etc., and it will not be repeated here. Specifically, in the present embodiment, the processor 401 of the terminal will load the communication identifier input by the user into the memory 402 according to the following instructions, and the processor 401 will process the communication identifier to generate a call instruction to continuous to execute the next steps as follows:

When the terminal receives the call instruction, triggered by the communication identification from the user input, under the VoLTE network or the VoWIFI network, if the communication identification is not a communication identification supported by the current terminal, the a verification request is sent based on the IMS network, and the response message returned by the verification server is received based on the verification request, then the type of the communication identification is determined according to the response message, and then the network mode of the operator network to which the terminal is currently connected is switched to the target network mode to initiate the call process according to the communication identification and the type of the communication identification.

Specific implementations of operations described above may refer to the previous embodiments, it will not be repeated here.

It can be known from the above descriptions that the terminal provided by the embodiments of the present application may provide a calling method, which is capable of saving users time when calling for help and improving efficiency of calls for help.

Persons skilled in this art may understand that all or part of the steps in the various ways of the above-mentioned embodiments can be executed by instructions, or by controlling related hardware through instructions. The instructions can be stored in a computer-readable storage medium and be loaded and executed by a processor.

For this, an embodiment of the present application provides a storage medium in which a plurality of instructions are stored, and the instructions can be loaded by a processor to execute any steps in the calling method provided by the embodiments of the present application. For example:

When the terminal receives a call instruction, triggered by the communication identification from the user input, under the VoLTE network or the VoWIFI network, if the communication identification is not a communication identification supported by the current terminal, a verification request is sent based on the IMS network, and the response message returned by the verification server is received based on the verification request, then the type of the communication identification is determined according to the response message, and then a network mode of the operator network to which the terminal is currently connected is switched to a target network mode to initiate a call process according to the communication identification and the type of the communication identification.

Specific implementations of operations described above may refer to the previous embodiments, it will not be repeated here.

Wherein, the storage medium may include: a read only memory (ROM), a random-access memory (RAM), and a magnetic disk, or an optical disk, etc.

Since any steps in the calling method provided by the embodiments of the present application can be executed by the instructions stored in the storage medium, refer to the previous embodiments for details on beneficial effects that can be achieved by any calling method provided by the embodiments of the present application. They will not be repeated here.

The calling method, the storage medium, and the terminal provided by the present embodiments of the present application are described in detail above. Specific examples are used in this article to illustrate principles and implementations of the present application. The above descriptions of the embodiments are only used to help understand the method of the present application and core ideas thereof. Furthermore, for persons skilled in this art, there will be changes in specific implementations and applications according to the ideas of the present application. In summary, the contents of the present specification should not be construed as a limitation on the present application.

What is claimed is:

1. A calling method, comprising steps of:
    when a terminal receives a call instruction, triggered by a communication identification from a user input, under a voice over long-term evolution (VoLTE) network or a voice over WIFI (VoWIFI) network, determining whether the communication identification is a communication identification supported by a current terminal based on the communication identification as well as a pre-customized phone number and a phone number supported by a Subscriber Identity Module (SIM) card that are supported by a current operator network;
    in response to determining that the communication identification is not the communication identification supported by the current terminal, sending a verification request to a verification server based on an IP multimedia subsystem (IMS) network;
    receiving a response message returned by the verification server based on the verification request;
    determining a type of the communication identification according to the response message; wherein a type of communication identification includes a type of emergency numbers and a type of common numbers; and
    according to the communication identification and the type of the communication identification, switching a network mode of an operator network to which the terminal is currently connected to a target network mode to initiate a call process, sending an emergency call request based on a 2G/3G network when the type of the communication identification is an emergency communication identification specified by the 3rd Generation Partnership Project (3GPP) protocol and sending a common call request based on the 2G/3G network when the type of the communication identification is not an emergency communication identifier specified by the 3GPP protocol;
    wherein the response information carries a type identifier configured to determine the type of the communication identification by identifying a prefix of the type identifier and determining the type of the communication identification according to the prefix;
    wherein a signaling of the emergency call request is emergency setup, and a signaling of the common call request is setup.

2. The method as claimed in claim 1, wherein according to the communication identification and the type of the communication identification, switching the network mode of the operator network to which the terminal is currently connected to the target network mode to initiate the call process comprises steps of:
    initiating a circuit switched fallback and registering to a 2G/3G network according to the communication identification and the type of the communication identification; and
    initiating the call process based on the 2G/3G network.

3. The method as claimed in claim 1, wherein after according to the communication identification and the type of the communication identification, switching the network mode of the operator network to which the terminal is currently connected to the target network mode to initiate the call process, the method further comprises steps of:
    determining a current network mode after ending a call; and
    changing the current network mode to re-register to the VoLTE network or the VoWIFI network when the current network mode is a 2G/3G network.

4. The method as claimed in claim 1, wherein the communication identification is a phone number.

5. The method as claimed in claim 1, wherein the verification server is a device that provides computing services for the IMS network.

6. A non-transitory computer-readable storage medium, wherein the storage medium stores a plurality of instructions, and the instructions are loaded by a processor to execute the following steps:

when a terminal receives a call instruction, triggered by a communication identification from a user input, under a voice over long-term evolution (VoLTE) network or a voice over WIFI (VoWIFI) network, determining whether the communication identification is a communication identification supported by a current terminal based on the communication identification as well as a pre-customized phone number and a phone number supported by a Subscriber Identity Module (SIM) card that are supported by a current operator network;

in response to determining that the communication identification is not the communication identification supported by the current terminal, sending a verification request to a verification server based on an IP multimedia subsystem (IMS) network;

receiving a response message returned by the verification server based on the verification request;

determining a type of the communication identification according to the response message; wherein a type of communication identification includes a type of emergency numbers and a type of common numbers; and according to the communication identification and the type of the communication identification, switching a network mode of an operator network to which the terminal is currently connected to a target network mode to initiate a call process, sending an emergency call request based on a 2G/3G network when the type of the communication identification is an emergency communication identification specified by the 3rd Generation Partnership Project (3GPP) protocol and sending a common call request based on the 2G/3G network when the type of the communication identification is not an emergency communication identifier specified by the 3GPP protocol;

wherein the response information carries a type identifier configured to determine the type of the communication identification by identifying a prefix of the type identifier and determining the type of the communication identification according to the prefix;

wherein a signaling of the emergency call request is emergency setup, and a signaling of the common call request is setup.

7. The storage medium as claimed in claim 6, wherein in the step of switching, according to the communication identification and the type of the communication identification, the network mode of the operator network to which the terminal is currently connected to the target network mode to initiate the call process, the instructions are loaded by the processor to execute the following steps:

initiating a circuit switched fallback and registering to a 2G/3G network according to the communication identification and the type of the communication identification; and initiating the call process based on the 2G/3G network.

8. The storage medium as claimed in claim 6, wherein after the step of switching, according to the communication identification and the type of the communication identification, the network mode of the operator network to which the terminal is currently connected to the target network mode to initiate the call process, the instructions are loaded by the processor to execute the following steps:

determining a current network mode after ending a call; and changing the current network mode to re-register to the VoLTE network or the VoWIFI network when the current network mode is a 2G/3G network.

9. The storage medium as claimed in claim 6, wherein the communication identification is a phone number.

10. The storage medium as claimed in claim 6, wherein the verification server is a device that provides computing services for the IMS network.

11. A terminal, comprising: a processor and a memory and a plurality of instructions stored in the memory, wherein the processor loads the instructions stored in the memory to execute the following steps:

when a terminal receives a call instruction, triggered by a communication identification from a user input, under a voice over long-term evolution (VoLTE) network or a voice over WIFI (VoWIFI) network, determining whether the communication identification is a communication identification supported by a current terminal based on the communication identification as well as a pre-customized phone number and a phone number supported by a Subscriber Identity Module (SIM) card that are supported by a current operator network;

in response to determining that the communication identification is not the communication identification supported by the current terminal, sending a verification request to a verification server based on an IP multimedia subsystem (IMS) network;

receiving a response message returned by the verification server based on the verification request;

determining a type of the communication identification according to the response message; wherein a type of communication identification includes a type of emergency numbers and a type of common numbers; and according to the communication identification and the type of the communication identification, switching a network mode of an operator network to which the terminal is currently connected to a target network mode to initiate a call process, sending an emergency call request based on a 2G/3G network when the type of the communication identification is an emergency communication identification specified by the 3rd Generation Partnership Project (3GPP) protocol and sending a common call request based on the 2G/3G network when the type of the communication identification is not an emergency communication identifier specified by the 3GPP protocol;

wherein the response information carries a type identifier configured to determine the type of the communication identification by identifying a prefix of the type identifier and determining the type of the communication identification according to the prefix;

wherein a signaling of the emergency call request is emergency setup, and a signaling of the common call request is setup.

12. The terminal as claimed in claim 11, wherein in the step of switching, according to the communication identification and the type of the communication identification, the network mode of the operator network to which the terminal is currently connected to the target network mode to initiate the call process, the processor executes the following steps:

initiating a circuit switched fallback and registering to a 2G/3G network according to the communication identification and the type of the communication identification; and initiating the call process based on the 2G/3G network.

13. The terminal as claimed in claim 11, wherein after the step of switching, according to the communication identification and the type of the communication identification, the network mode of the operator network to which the terminal is currently connected to the target network mode to initiate the call process, the processor executes the following steps:
   determining a current network mode after ending a call; and
   changing the current network mode to re-register to the VoLTE network or the VoWIFI network when the current network mode is a 2G/3G network.

14. The terminal as claimed in claim 11, wherein the communication identification is a phone number.

15. The terminal as claimed in claim 11, wherein the verification server is a device that provides computing services for the IMS network.

\* \* \* \* \*